United States Patent [19]
Amrany et al.

[11] Patent Number: 6,144,733
[45] Date of Patent: Nov. 7, 2000

[54] RING FILTER FOR POTS COMMUNICATION SYSTEM

[75] Inventors: Danny Amrany, Wayside; Arnold Muralt, Fair Haven, both of N.J.

[73] Assignee: Globespan Semiconductor, Inc., Red Bank, N.J.

[21] Appl. No.: 09/014,813

[22] Filed: Jan. 28, 1998

[51] Int. Cl.[7] .................................................. H04M 11/00
[52] U.S. Cl. ........................ 379/373; 379/399; 379/93.09
[58] Field of Search .................................. 379/399, 373, 379/379, 93.09, 93.01, 242, 251

[56] References Cited

U.S. PATENT DOCUMENTS

| | | | |
|---|---|---|---|
| 3,955,051 | 5/1976 | Bitzer | 379/373 |
| 5,027,391 | 6/1991 | O'Neill et al. | 379/373 |
| 5,307,407 | 4/1994 | Wendt et al. | 379/418 |
| 5,557,670 | 9/1996 | Perry et al. | 379/339 |
| 5,751,803 | 5/1998 | Shpater | 379/379 |
| 5,848,150 | 12/1998 | Bingel | 379/399 |

*Primary Examiner*—David R. Hudspeth
*Assistant Examiner*—Daniel Abebe
*Attorney, Agent, or Firm*—Thomas, Kayden, Horstemeyer, & Risley

[57] ABSTRACT

An line interface circuit at a central office of a telecommunication system provides improved noise immunity to a ring signal. In accordance with one aspect of the invention, the line interface circuit includes a signal line having a first end for connection to a ring signal generating source and a second end for communication with a customer premises via a local loop. A POTS filter is electrically connected to the signal line. Preferably, the POTS filter is a relatively simple and thus inexpensive low-order filter, which may be implemented as a simple L-C circuit. The preferred embodiment of the present invention further includes a POTS communication device electrically connected to the signal line at a point between the POTS filter and the first end. In this regard, the POTS communications device broadly denotes any device designed to communicate information within the POTS frequency band, such as a telephone (e.g., voice information), a facsimile machine, a PSTN modem, etc. The circuit further includes a ring signal noise elimination filter integrally connected to the signal line and interposed between the POTS filter and the ring signal generating source. The ring signal noise elimination filter is a low-pass filter configured to substantially block the passage of signals above the frequency of the ring signal (e.g., 20 hertz).

20 Claims, 5 Drawing Sheets

RING FILTER FOR POTS COMMUNICATION SYSTEM

BACKGROUND OF THE INVENTION

1. Field of the Invention

The present invention generally relates to communication systems, and more particularly, to improved line interface circuitry providing improved noise immunity and lower cost at a central office of a telecommunications system.

2. Discussion of the Related Art

In recent years telephone communication systems have expanded from traditional plain old telephone system (POTS) communications to include high-speed data communications as well. As is known, POTS communications includes not only the transmission of voice information, but also PSTN (public switched telephone network) modem information, control signals, and other information that is transmitted in the POTS bandwidth, which extends from approximately DC to approximately 3.4 kilohertz.

New, high-speed data communications provided over digital subscriber lines, such as Asymmetric Digital Subscriber Line (ADSL), Rate Adaptive Digital Subscriber Line (RADSL), etc. (more broadly denoted as xDSL) provide for high speed data transmissions, as is commonly used in communicating over the Internet. As is known, the bandwidth for xDSL transmissions is generally defined by a lower cutoff frequency of approximately 30 kilohertz, and a higher cutoff frequency which varies depending upon the particular technology. Since the POTS and xDSL signals are defined by isolated frequency bands, both signals may be transmitted over the same two-wire loop.

A POTS splitter is typically provided at each end of a transmission system communicating both POTS and xDSL information. As is known, a POTS splitter circuit consists of a high-pass filter and a low-pass filter, which are used to separate the two signals (the POTS signal from the xDSL signal). Normally, the high-pass filter is built into the xDSL transceiver, whereas the low-pass filter (commonly referred to as a POTS filter) is normally provided as a separate unit. In operation, the POTS filter operates to reject the high frequency xDSL signals in order to protect the POTS (e.g., telephone) circuitry.

At the same time the POTS filter provides filtering and protection for higher frequency noise signals that are often associated with a ring signal, or the switching circuitry of a central office.

A "line-card", containing line interface circuitry, is provided at the central office.

The line interface circuitry provides the interconnections among the xDSL circuitry, POTS or PSTN voice circuitry, off-hook (or tip/ring) detection circuitry, ring generator circuitry, and the local loop. The line interface circuitry also includes the appropriate electronic filtering circuitry to minimize any noise transmission across the local loop. As is known, there are several such sources of noise, including the ring generator circuitry, and contact noise that results from switch contacts or other mechanisms for opening and closing circuit connections.

Conventionally, in prior art systems a POTS filter is interposed between the various POTS circuits and the xDSL circuit. This filter protects the POTS circuitry from the high frequency signals of the xDSL transmission circuitry, as well as filters noise generated from the relay or other circuit contacts and the ring generator circuitry from reaching the local loop. To achieve these objectives, this filter circuit is typically realized by a relatively high-order filter to achieve the desired characteristics. Namely, to achieve a cut-off frequency in the range of 4 to 10 kilohertz, but achieve a very large stop band attenuation (e.g., greater than 100 dB) inside the xDSL frequency band (i.e., above 30 kilohertz). As is known, the requirement of a high-order filter complicates the filter design and thus makes the filter more expensive.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an improved line interface circuit at a central office of a telecommunication system for providing better noise immunity at a lower cost. In accordance with one aspect of the invention, the line interface circuit includes a signal line having a first end for connection to a ring signal generating source and a second end for communication with a customer premises via a local loop. A POTS filter is electrically connected to the signal line. The cut-off frequency of the POTS filter is selected such that a voice signal passes through the filter essentially undisturbed. The preferred embodiment of the present invention further includes a POTS communication device electrically connected to the signal line at a point between the POTS filter and the first end. In this regard, the POTS communications device broadly denotes any device designed to communicate information within the POTS frequency band, such as a telephone (e.g., voice information), a facsimile machine, a PSTN modem, etc. The circuit further includes a ring signal noise elimination filter (or ring filter for short) integrally connected to the signal line and interposed between the POTS filter and the ring signal generating source. The ring filter is a low-pass filter configured to substantially block the passage of signals above the frequency of the ring signal. As is known, the ring signal typically generated is at approximately 20 hertz. However, the present invention is not limited to a specific frequency. Indeed, the U.S. specifications define a ring signal frequency between 15.3 hertz and 68 hertz. Thus, the ring filter of the present invention certainly applies to this range of frequencies.

As the cut-off frequency of the ring filter can be selected to be much lower than the cut-off frequency of the POTS filter, a low order, and therefore inexpensive, filter may achieve the desired results and filtering effect. Thus, the combined complexity and cost of the proposed POTS and ring filters are lower than the cost of a conventional (higher order) POTS filter, since the requirements on each filter are significantly relaxed.

In accordance with another aspect of the invention, the line interface circuit at the central office includes a signal line having a first end for communication with a ring signal generating source and a second end for communication with a customer premises via a local loop. The circuit further includes a POTS communication device electrically connected to the first end of the signal line, by means of a POTS filter. As before, the POTS communications device broadly denotes any device designed to communicate information within the POTS frequency band, such as a telephone (e.g., voice information), a facsimile machine, a PSTN modem, etc. The circuit further includes a xDSL communication device electrically connected to the local loop. It will be appreciated that "xDSL" generically denotes any of a variety of digital subscriber line technologies, including DSL, ADSL, RADSL, etc. Further, the circuitry includes a ring filter integrally connected to the signal line between the local loop and the ring signal generating source. Finally, the circuit includes a switch interposed along the signal line between the ring signal generating source and the ring filter, and a switch controller circuit that is specially configured to ensure that the switch opens and closes at times coincident with zero axis crossings of the ring signal (i.e., when the oscillatory ring signal is at a value of zero volts).

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
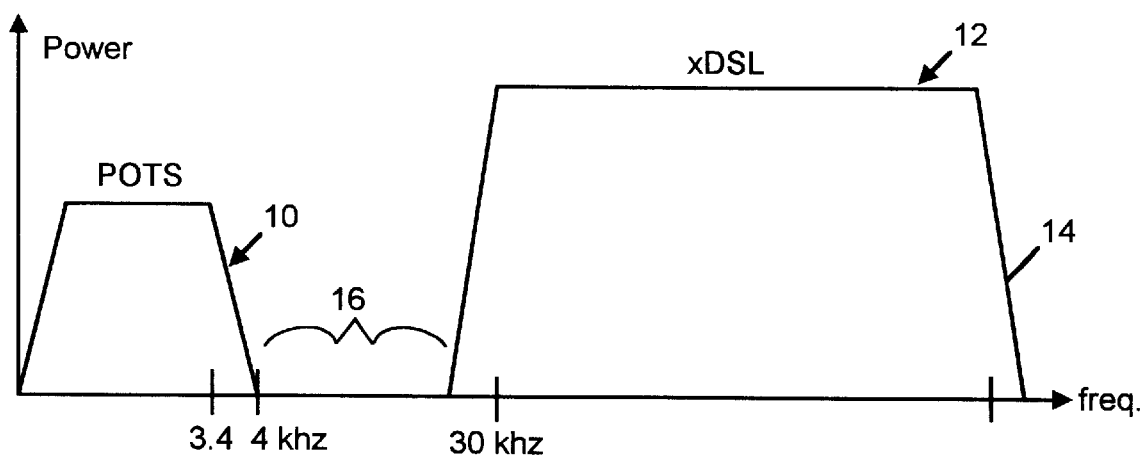
FIG. 1 is graph showing the power spectrum for POTS and xDSL transmission bands.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Turning now to the drawings, FIG. 1 shows the spectrum allocation for both POTS and xDSL signals. Specifically, the graph is a plot of frequency on the horizontal axis and power on the vertical axis. As is known, the POTS frequency band 10 generally extends from approximately DC to approximately 3.4 kilohertz. The xDSL frequency band 12 generally extends from approximately 30 kilohertz up to an upper boundary 14, which varies depending upon the particular digital subscriber line technology utilized. A separation or guard band 16 provides some margin of signal separation, and thus noise and cross-talk immunity between signal transmissions between the POTS 10 and xDSL 12 frequency bands.

Figure 2:
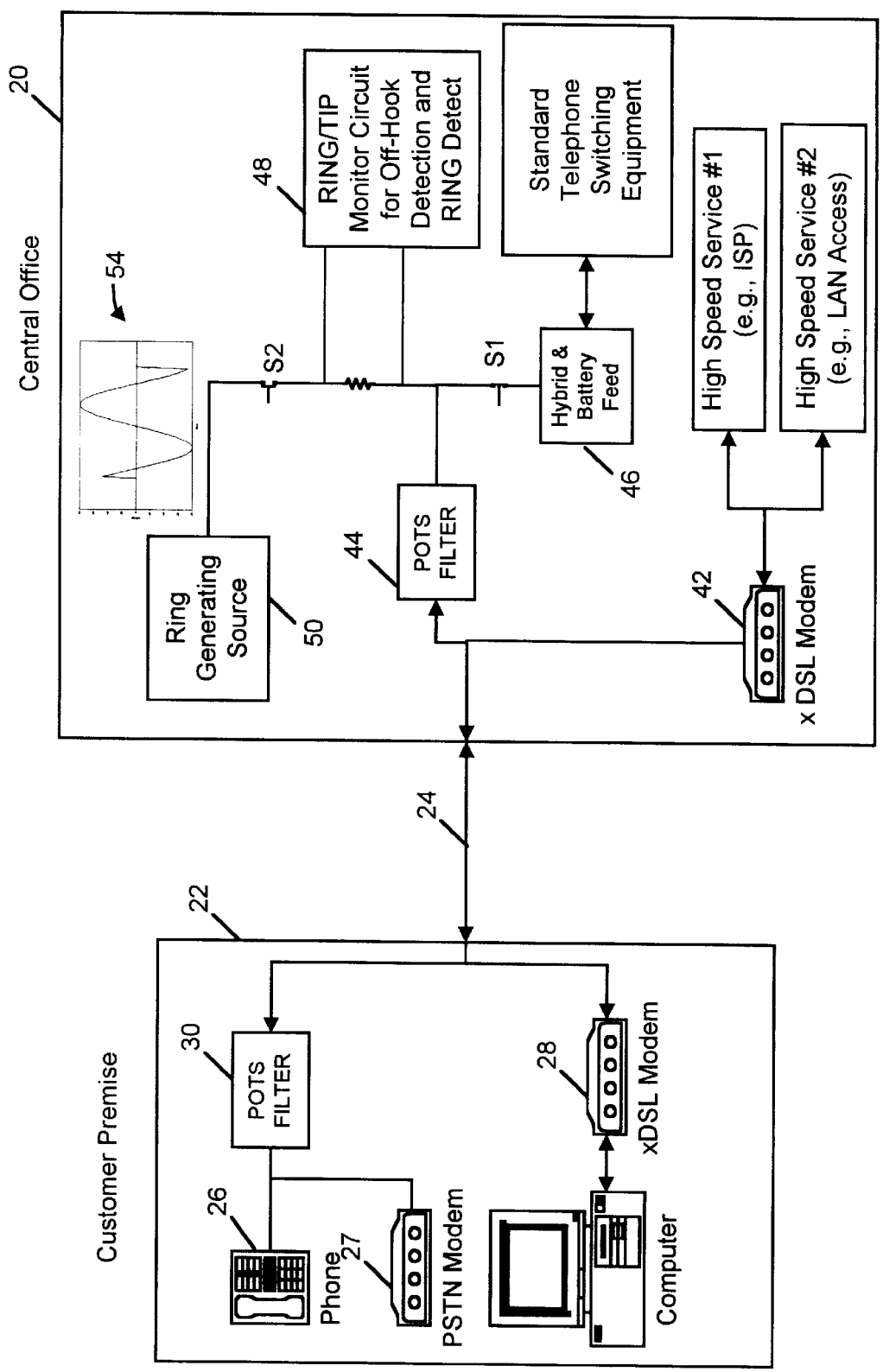
FIG. 2 is a block diagram illustrating the principal components of a prior art telecommunication system, at both the central office and customer premises.

Referring now to FIG. 2, a prior art communication system is shown. Specifically, FIG. 2 illustrates communication between a central office 20 and a customer premises 22 by way of local loop 24. While the customer premises 22 may be a single dwelling residence, a small business, or other entity, it is generally characterized as having POTS equipment, such as a telephone 26, PSTN modem 27, fax machine (not shown), etc. The customer premise 22 may also include an xDSL communication device, such as an xDSL modem 28. When an xDSL service is provided, a POTS filter 30 is interposed between the POTS equipment 26 and the local loop 24. As is known, the POTS filter 30 includes a low-pass filter having a cut-off frequency of approximately 4 to 10 kilohertz, in order to filter high frequency transmissions from the xDSL communication device 28 and protect the POTS equipment.

At the central office 20, additional circuitry is provided. Generally, a line card containing line interface circuitry is provided for electrical connection to the local loop 24. An xDSL modem 42, including both receiver and transmitter circuitry, is broadly denoted by block 42. This circuitry is directly connected for communications across the local loop 24. The remaining POTS circuitry is separated from the local loop 24 by POTS filter 44. Specifically, other circuitry commonly carried on the line interface card includes a hybrid 46, off-hook detection circuitry 48, and ring generator circuitry 50. Typically, the hybrid circuitry is intermittently connected to the local loop 24 by a switching means denoted as S1. As will be appreciated, the switching means S1 may be provided in the form of a relay, an analog switch, a digital switch, or otherwise. It is, however, significant to note that switch S1 is typically maintained in a normally closed configuration (and thus momentarily opened). As is known, a hybrid circuit 46 is a device for translating between two-wire and four-wire communication links. For purpose of illustrating the present invention, it is important to note that voice and other POTS information is communicated through the block denoted as hybrid circuitry 46 to/from the local loop 24. As is well known, the off-hook detection circuitry 48 is the circuitry utilized at the central office to detect when a user at the customer premises 22 has lifted a telephone handset or otherwise has sought to establish communications from a POTS device.

The ring generation circuitry 50, in a manner that is known, generates a ring signal for communication across the local loop 24, to cause a telephone 26 or other POTS equipment to ring at a customer premises 22. Typically, the ring generation circuitry 50 is disconnected from the local loop 24 by way of a normally open switching means S2. Like S1, the switching means S2 may be implemented in a variety of ways including, but not limited to, a relay, a digital switch (i.e., digital control), an analog switch etc. As is known, and briefly discussed previously, the switches S1 and S2, as well as the ring generation circuitry itself, are all sources of noise that is otherwise injected onto the local loop 24. Specifically, it is known that the ring generation circuitry generates a signal of approximately 20 hertz, having an amplitude of approximately of 80 volts. However, if not properly controlled, the switch S2 opens and closes at times that result in an incoherent signal, insofar as it is uncontrolled and thus does not start and stop at the zero axis crossing. To illustrate, reference numeral 54 designates a voltage versus time illustration of a typical ring signal that is applied to the local loop, when S2 is allowed to open and close indiscriminately. As illustrated, the signal may start at a given amplitude other than zero. When this occurs, the result is high frequency noise in the form of harmonics generated from the sharp signal edge. To minimize the deleterious effects of this and other noise signals, the POTS filter 44 is typically designed as a high order filter to achieve a sharp roll-off at frequencies above the approximately 3.4 kilohertz upper frequency band edge.

Figure 3:
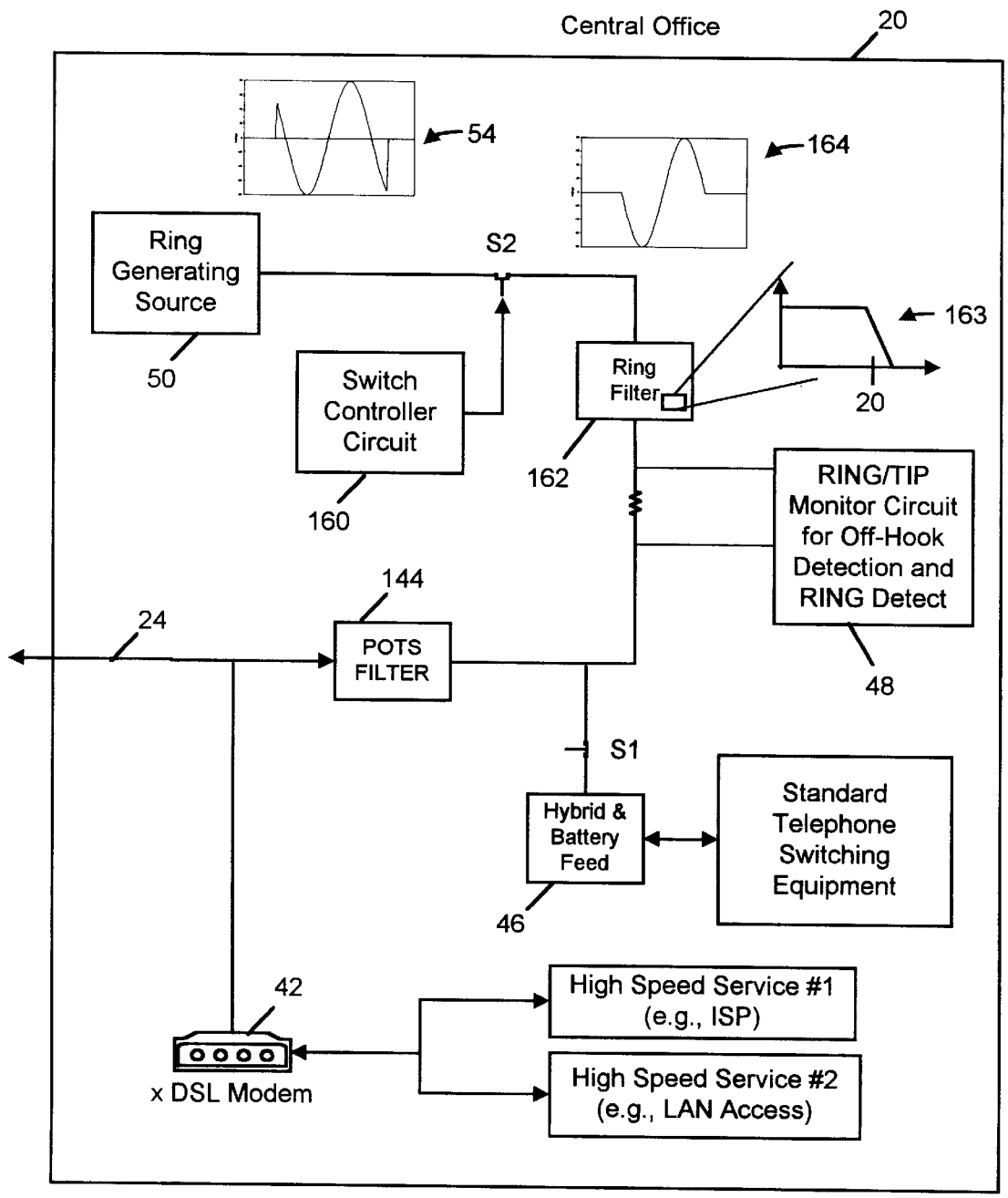
FIG. 3 is a block diagram of a line interface circuit provided at a central office, illustrating the primary components of the present invention.

Reference is now made to FIG. 3 which shows the improved line card circuitry provided by the preferred embodiment of the present invention. As is seen, the circuitry is similar to that illustrated and discussed in connection with the central office of FIG. 2.

Therefore, the description provided herein need not reiterate the discussion of those devices that are common to both configurations. In short, the preferred embodiment of the present invention is realized by and a ring filter 162 and switch controller circuit 160.

Significantly, a primary object and advantage of the present invention is realized by the insertion of the ring filter 162. Specifically, the ring filter 162 is a low-pass filter defined by a cut-off frequency of approximately 20 hertz (See reference numeral 163). As previously mentioned, the frequency of the ring signal may vary from approximately 15.3 hertz to approximately 68 hertz, and still remain within the defined U.S. specifications.

Accordingly, reference made herein to the 20 hertz ring signal should be understood to be illustrative and not limiting, in that the concepts and teachings of the present invention apply to ring signals of other frequencies.

In keeping with the description of the preferred embodiment, the ring filter 162 rejects signals above the frequency of the ring signal, and thus such signals are inhibited from passing through ring filter 162. It will be appreciated that the cut-off frequency of the ring filter 162 permits the ring signal generated by ring generation circuitry 50 to pass through the ring filter 162 for application to the local loop 24 (thus reaching the customer premises). However the 20 nhertz cut-off frequency of ring filter 162 prevents higher order noise signals generated by edge effects of the ring generator circuit 50, as well as noise injected from switch contacts S2. It will be appreciated, that the ring filter circuitry 162 can be implemented in any of a variety of ways. For example, it may be implemented as a low cost, low order inductor-capacitor (L-C) circuit, as well as a more costly active filter.

Preferably, it will be implemented as the former. Another advantage of the ring filter 162, is that it filters noise signals that would otherwise be present in the POTS band. That is, noise signals generated by the ring generator source 50 or switch S2 in the DC to 3.4 kilohertz range.

A particular advantage achieved by the present invention, and more particularly the placement of the ring filter 162 in the location illustrated, is that it permits a relatively inexpensive-low order POTS filter 144 to be implemented, rather than the more costly, high-order POTS filter 44 of FIG. 2.

Another component provided in the preferred embodiment of the present invention is denominated as switch controller circuit 160. As illustrated, the switch controller circuit is disposed to control the operation of switch S2. In operation, the switch controller circuit operates to improve the ring signal generated collectively by the ring generation circuitry 50 and switch S2 in order to minimize, if not eliminate, the edge effects otherwise resulting from the incoherent signal generation. Specifically, the signal diagram denoted by reference numeral 164 illustrates the ring signal, when the switch S2 is controlled by the switch controller circuit 160 in a manner that closely controls the opening and closure of the switch S2, to limit those events to occuring at or near the zero crossing points (i.e., when the amplitude of the ring signal is at or near zero volts). It will be appreciated, that the switch controller circuit 160 illustrated in FIG. 3 has been presented as such merely for purposes of illustrating the concept of the improvement provided thereby.

Figure 4:
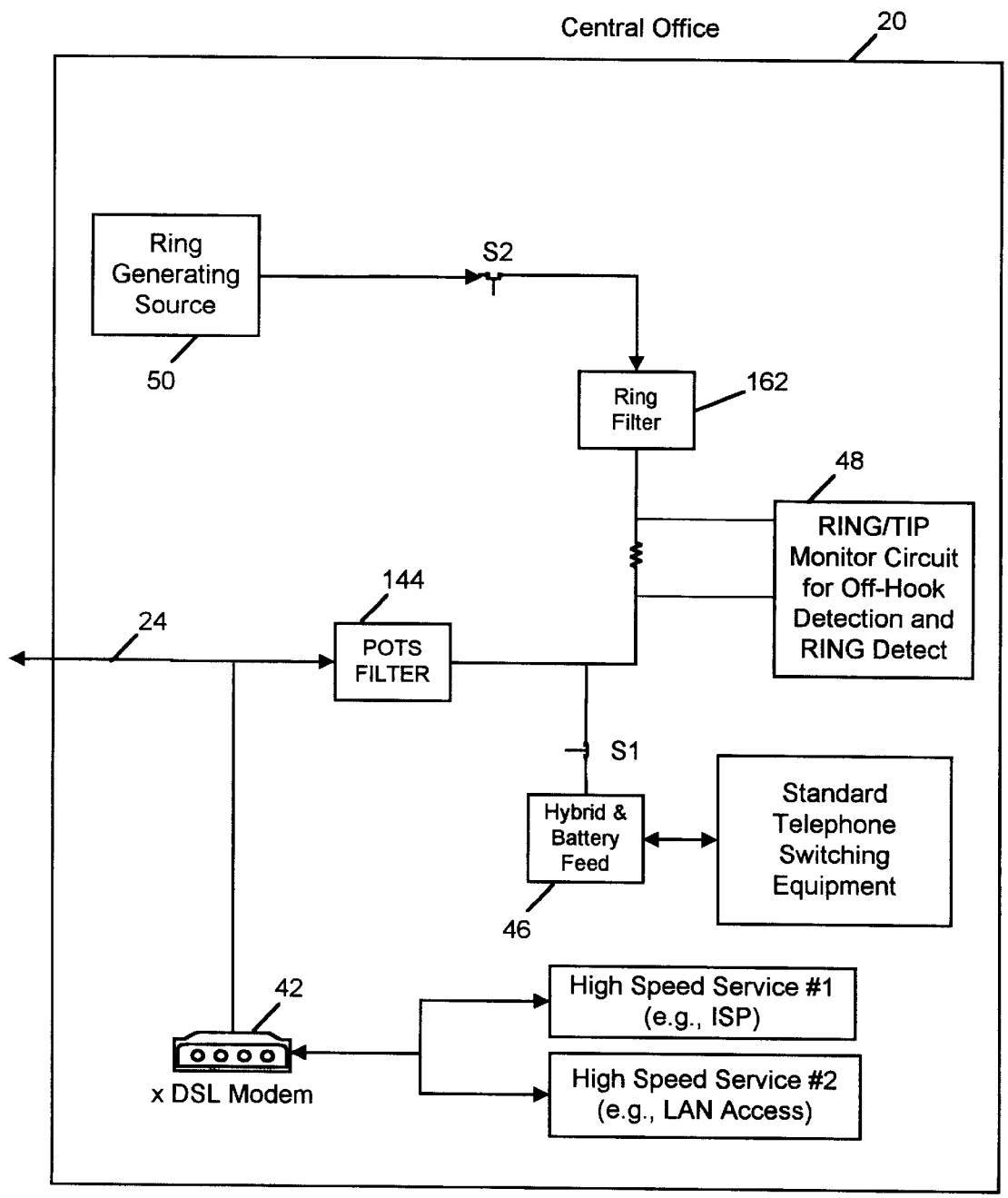
FIG. 4 is a block diagram similar to FIG. 3, but illustrating an alternative embodiment of the present invention.
Figure 5:
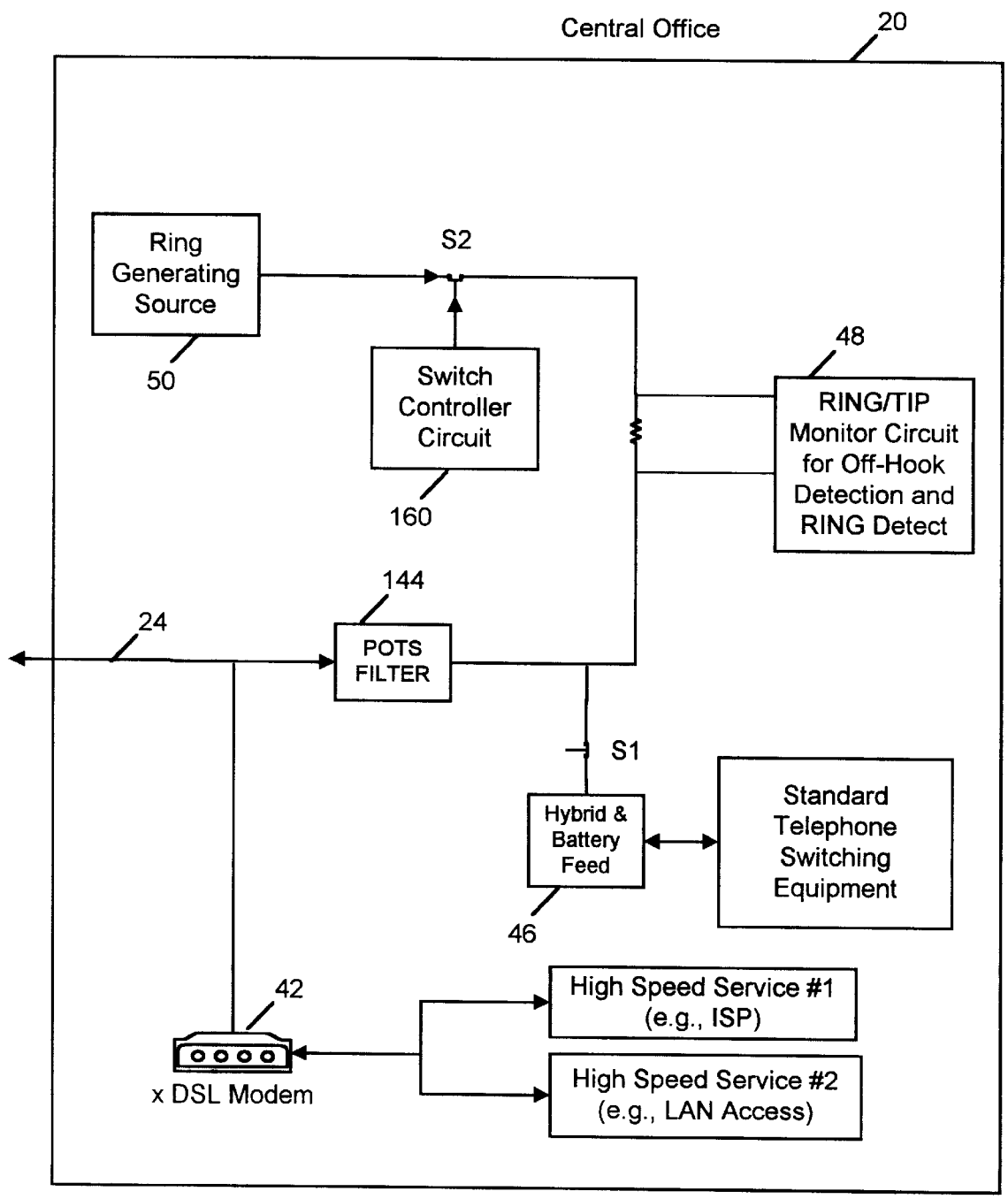
FIG. 5 is a block diagram similar to FIG. 3, but illustrating yet another embodiment of the present invention.

Reference is now made briefly to FIGS. 4 and 5, which show alternative embodiments of the present invention.

Specifically, FIG. 4 illustrates a line card 40 implementing the ring filter 162 of the present invention, but omitting the switch controller circuit 160. It will be appreciated that this embodiment will still achieve vast performance and improvements of systems of the prior art, insofar as the ring filter circuit 162 will serve to filter out most, if not all, of the noise signals resulting from the edge effects of the ring generator circuitry. Similarly, FIG. 5 shows a further embodiment of the present invention implementing the switch controller circuitry, but not including the ring filter circuitry 162. Again, performance gains from this embodiment will nonetheless be achieved over systems known in the prior art, as the noise typically generated by the ring generator circuitry 50 will be reduced by the switch controller circuit 160.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. In a communication system configured to communicate both POTS and xDSL, an apparatus for providing better noise immunity comprising:

a signal line having a first end for connection to a ring signal generating source, the ring generating source configured to output a ring signal having a predetermined frequency;

a POTS filter electrically connected to the signal line;

a POTS communication device electrically connected to the signal line at a point between the POTS filter and the first end;

a ring signal noise elimination filter integrally connected to the signal line and interposed between the POTS filter and the ring generating source, the ring signal noise elimination filter configured to block the passage of signals having a frequency higher than the ring signal.

2. The apparatus of claim 1, wherein the POTS filter is configured to pass signals having a frequency of less than approximately 3400 hertz.

3. The apparatus of claim 2, wherein the POTS filter is a low-order filter.

4. The apparatus of claim 1, wherein the ring signal noise elimination filter is a low-pass filter defined by a cut-off frequency just higher than the frequency of the ring signal.

5. The apparatus of claim 4, wherein the ring signal noise elimination filter is defined by a cut-off frequency of approximately 20 hertz.

6. The apparatus of claim 1, wherein the POTS communication device includes one or more devices selected from the group consisting of: a telephone, a PSTN modem, and a facsimile machine.

7. The apparatus of claim 1, wherein the ring signal elimination filter is configured to pass signals having a frequency of less than approximately 20 hertz.

8. The apparatus of claim 1, further including a xDSL communication device for communicating xDSL signals.

9. The apparatus of claim 1, further including a switch interposed along the signal line between the ring signal generating source and the ring signal elimination filter, and a switch controller circuit configured to closely control the operation of the switch, wherein the switch operation is controlled to open and close at times when the amplitude of the ring signal is near zero volts.

10. In a central office of a communication system, an apparatus for providing better noise immunity to a ring signal comprising:
- a signal line having a first end for connection to a ring signal generating source and a second end for communication with a customer premise;
- a POTS communication device electrically connected to the first end of the signal line;
- a xDSL communication device electrically connected to the second end of the signal line;
- a POTS filter integrally connected to the signal line between the first and second ends; and
- a ring signal elimination filter integrally connected to the signal line and interposed between the POTS filter and the first end.

11. The apparatus of claim 10, wherein the POTS filter is configured to pass signals having a frequency of less than approximately 3400 hertz.

12. The apparatus of claim 11, wherein the POTS filter is a low-order filter.

13. The apparatus of claim 10, wherein the signal line includes two conductors.

14. The apparatus of claim 10, wherein the ring signal noise elimination filter is a low-pass filter defined by a cut-off frequency just higher than the frequency of the ring signal.

15. The apparatus of claim 14, wherein the ring signal noise elimination filter is defined by a cut-off frequency of approximately 20 hertz.

16. The apparatus of claim 10, wherein the POTS communication device includes one or more devices selected from the group consisting of: a telephone, a PSTN modem, and a facsimile machine.

17. The apparatus of claim 10, wherein the ring signal elimination filter is configured to pass signals having a frequency of less than approximately 20 hertz.

18. The apparatus of claim 10, further including a switch interposed along the signal line between the ring signal generating source and the ring signal elimination filter, and a switch controller circuit configured to closely control the operation of the switch, wherein the switch operation is controlled to open and close at times when the amplitude of the ring signal is near zero volts.

19. In a central office of a communication system, a line interface circuit for providing better noise immunity to a ring signal comprising:
- a signal line having a first end for communication with a ring signal generating source and a second end for communication with a local loop;
- a POTS communication device electrically connected to the first end of the signal line;
- a xDSL communication device electrically connected to the local loop;
- a POTS filter integrally connected to the signal line between the local loop and a ring signal generating source; and
- a switch interposed along the signal line between the ring signal generating source and the ring signal elimination filter, and a switch controller circuit configured to closely control the operation of the switch, wherein the switch operation is controlled to open and close at times when the amplitude of the ring signal is near zero volts.

20. The apparatus of claim 19, further including a ring signal elimination filter integrally connected to the signal line and interposed between the POTS filter and the switch.

* * * * *